United States Patent [19]

Terajima

[11] Patent Number: 5,309,251
[45] Date of Patent: May 3, 1994

[54] COMMUNICATION APPARATUS CAPABLE OF CONNECTING MEMORY CARD

[75] Inventor: Hisao Terajima, Yokohama, Japan

[73] Assignee: Canon Kabushiki Kaisha, Tokyo, Japan

[21] Appl. No.: 44,892

[22] Filed: Apr. 7, 1993

Related U.S. Application Data

[63] Continuation of Ser. No. 685,209, Apr. 15, 1991, abandoned.

[30] Foreign Application Priority Data

Apr. 19, 1990 [JP] Japan .................. 2-104214

[51] Int. Cl.⁵ .............. H04N 1/40; H04N 1/00
[52] U.S. Cl. ................... 358/444; 358/400; 358/404
[58] Field of Search .............. 358/400, 401, 403, 404, 358/406, 440, 442, 443, 444, 296; 379/100; 395/775

[56] References Cited

U.S. PATENT DOCUMENTS

| | | | |
|---|---|---|---|
| 4,064,389 | 12/1977 | Patterson | 235/431 |
| 4,432,020 | 2/1984 | Onose et al. | 358/257 |
| 4,719,516 | 1/1988 | Nagashima | 358/444 |
| 4,821,107 | 4/1989 | Naito et al. | 358/440 |
| 4,900,902 | 2/1990 | Sakakibara | 235/375 |
| 5,148,543 | 9/1992 | Tamada et al. | 395/700 |

FOREIGN PATENT DOCUMENTS

| | | | |
|---|---|---|---|
| 58-138165 | 8/1983 | Japan | H04N 1/02 |
| 59-064967 | 4/1984 | Japan | H04N 1/32 |
| 2084425 | 4/1982 | United Kingdom | H04N 1/32 |

*Primary Examiner*—Edward L. Coles, Sr.
*Assistant Examiner*—Thomas D. Lee
*Attorney, Agent, or Firm*—Fitzpatrick, Cella, Harper & Scinto

[57] ABSTRACT

The present invention relates to a communication apparatus capable of connecting a memory card in which a data can be written.

The communication apparatus comprises connecting means for connecting a memory card, communication means for communicating through a circuit, and writing means for writing an information relating to a communication result obtained by the communication means in a memory card connected with the connecting means.

34 Claims, 6 Drawing Sheets

COMMUNICATION APPARATUS CAPABLE OF CONNECTING MEMORY CARD

This application is a continuation of application Ser. No. 07/685,209, filed Apr. 15, 1991, now abandoned.

BACKGROUND OF THE INVENTION

1. Field of the Invention

The present invention relates to a communication apparatus capable of connecting a memory card in which data can be written.

2. Related Background Art

Generally, in a case where a facsimile apparatus is used by plural users, payers of the telephone rates may be different depending on the users who have used the facsimile apparatus. For example, when a facsimile apparatus is used by staffs of two sections in a workshop, the respective sections may each have a budget for communication expenses.

In this case, it is necessary to clarify how much was used by the staff of each section.

To cope with such a situation, a facsimile apparatus having a function of controlling or managing communication charges for each department has been conventionally provided.

When the facsimile apparatus has been loaded with a card, in which user identification (ID) information such as a number to identify a user or a user's name has been stored, the user ID information together with a communication result is left stored in a memory within the facsimile apparatus beforehand. The user ID information has been designed to be provided with each communication when the communication result is output.

Since the above communication result is stored in the memory within the facsimile apparatus, the number of communication results to be stored is limited in accordance with the capacity of this memory. When the assignment region of the memory is full of communication results, all of the communication results which have been stored are printed out and are erased from the memory to prepare for next communications.

Conventionally, when the number of users increases, the number of the above cards increases accordingly. Therefore, the number of cases for each user which have been printed out on one sheet of a communication result report, decreases. Accordingly, each user must refer to several sheets of communication result reports to know the quantity of use of the user himself, and it is very inconvenient.

If the memory capacity to store the communication result is increased to avoid such an inconvenience, the cost of the apparatus will be raised. Especially, since all facsimile apparatuses are not commonly used by many users as mentioned above, a large capacity of memory provided for storing the communication result may be greatly wasteful in some cases. It will be very uneconomical if the memory capacity is increased on the same basis.

Also, when a plurality of facsimile apparatuses are used by one user, a plurality of facsimile communication control reports must all be collected to control the state of use of these facsimile apparatuses by the user.

SUMMARY OF THE INVENTION

It is an object of the present invention to improve a configuration for controlling communication.

It is a further object of the present invention to provide a configuration for collectively controlling communication for a plurality of communication apparatus.

It is also an object of the present invention to save memory for controlling communication.

Other objects of the present invention will become apparent from the following description.

DESCRIPTION OF THE PREFERRED EMBODIMENTS

Figure 1:
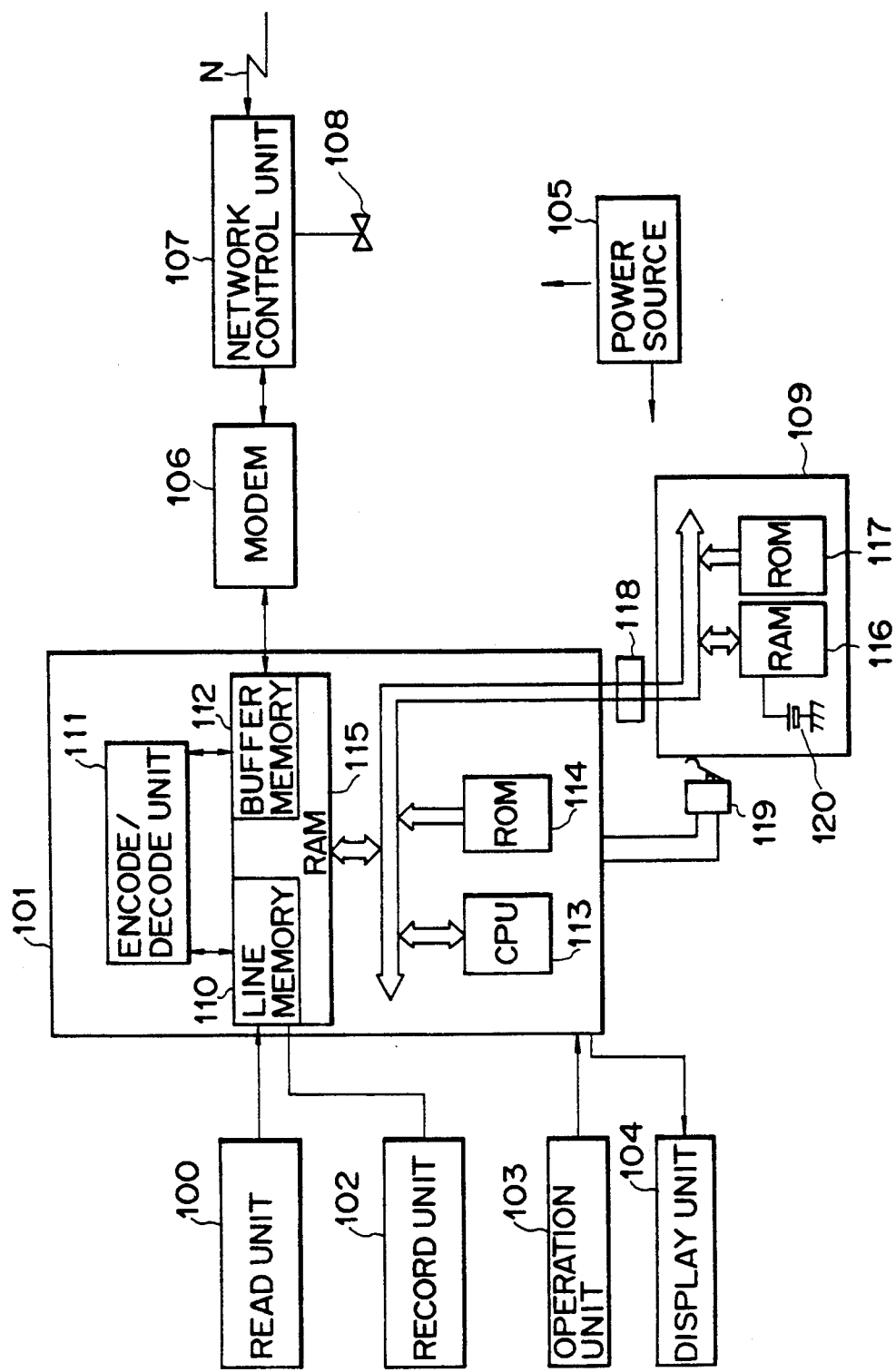
FIG. 1 is a block diagram showing a facsimile apparatus according to an embodiment of the present invention.

FIG. 1 is a block diagram showing a facsimile apparatus according to an embodiment of the present invention.

A control unit 101 comprises a CPU (central processing unit) 113, a ROM (read only memory) 114 for storing a control program of the CPU 113, a RAM (random access memory) 115 which is used as a work area for the CPU 113, a line memory 110 and a buffer memory 112, of which the RAM 115 consists, and a encode/decode unit 111 control image input and output and the communication process as a whole in this facsimile apparatus.

The image input/output are performed by a read unit 100 and a record unit 102.

That is, original image data is read by the read unit 100 consisting of a CCD (charge coupled device) sensor, an original conveyance system, etc. Received image data or image data read by the read unit 100 during a copying operation, is recorded by the record unit 102 consisting of a thermal printer, an ink-jet printer, etc.

Image data is input and output through a line memory 110, which processes one line as a unit, among the read unit 100, the record unit 102 and the encode/decode unit 111. Also, data input and output between the encode/decode unit 111 and a communication circuit are controlled through the buffer memory 112 having a larger unit of processing (for example, a specified number of pages) than one line. The encode/decode unit 111 performs a well-known encoding/decoding process through such as an MH, MR or MMR method to suppress redundancy, and may be comprised of a software of the CPU 113.

Connection with a communication line N, such as a telephone circuit, and data input/output are performed by a MODEM 106 and a network control unit 107. A telephone set (or a handset, etc.) 108 for call and manual control is connected with the network control unit 107.

The communication operation is controlled through a control panel 103. The control panel 103 is comprised of a numeric keypad (to input a telephone number), various function keys, etc. The control panel 103 is provided with a display unit 104 used to display a telephone number, time, etc.

A power required to drive this apparatus is supplied from a power source 105 consisting of a switching power source, etc. The supply of power to each unit is also controlled by the control unit 101.

This facsimile apparatus is so constructed that an external memory 109, an IC card for example, can be removably connected.

That is, this external memory 109 is connected with the control unit 101 through a connector 118, and has a RAM 116 for storing a communication result, etc., a ROM 117 for storing external memory ID information peculiar to each external memory 109, and a backup battery 120 to retain the content of memory of the RAM 116 when the external memory 109 has been removed from the facsimile apparatus.

Also, the facsimile apparatus has a sensor to detect presence of the external memory 119, consisting of a microswitch, etc., to notify the control unit 101 of whether or not the external memory 109 is connected with the control unit 101.

Figure 2:
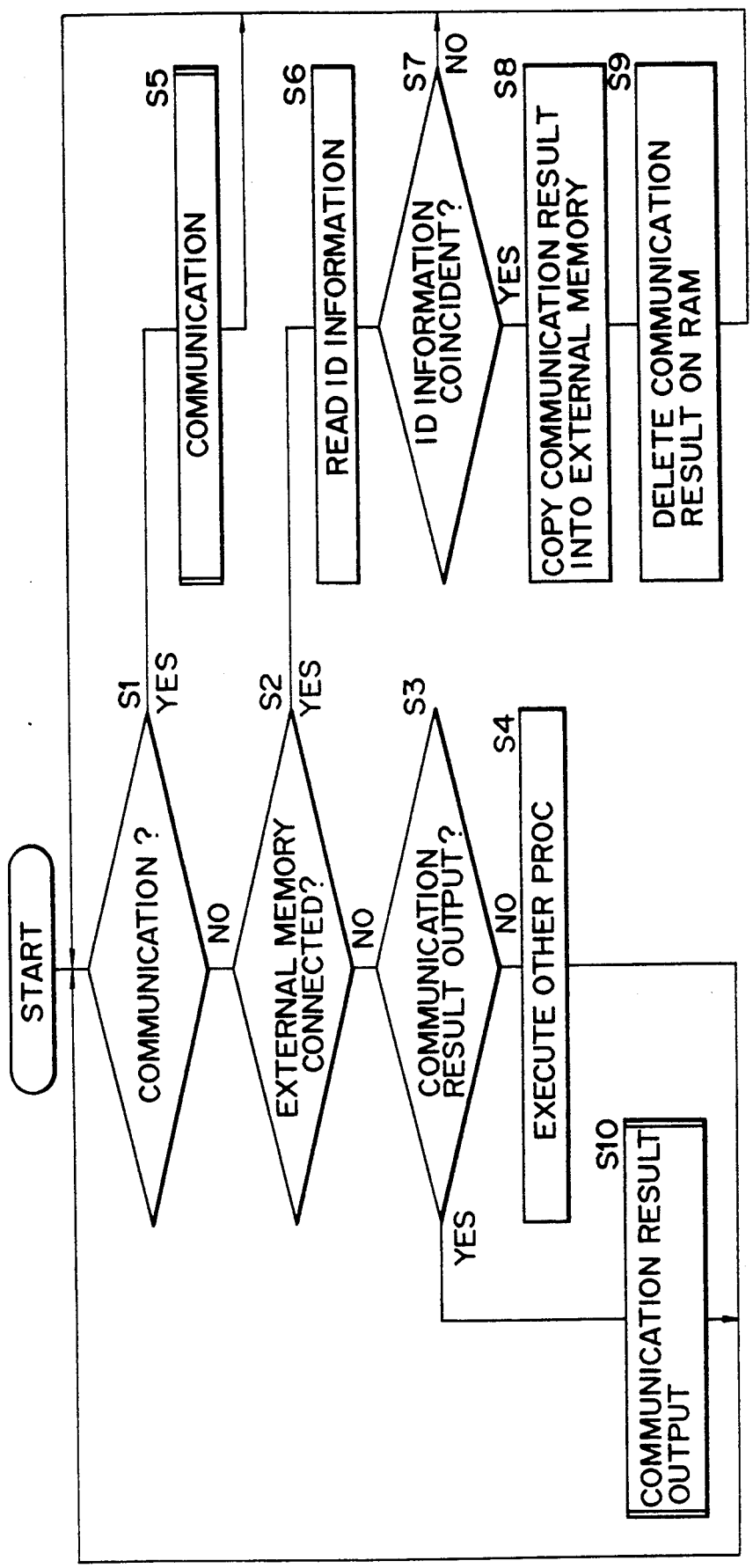
FIG. 2 is a flow chart showing the basic operation of a control unit according to the embodiment of the present invention.
Figure 3:
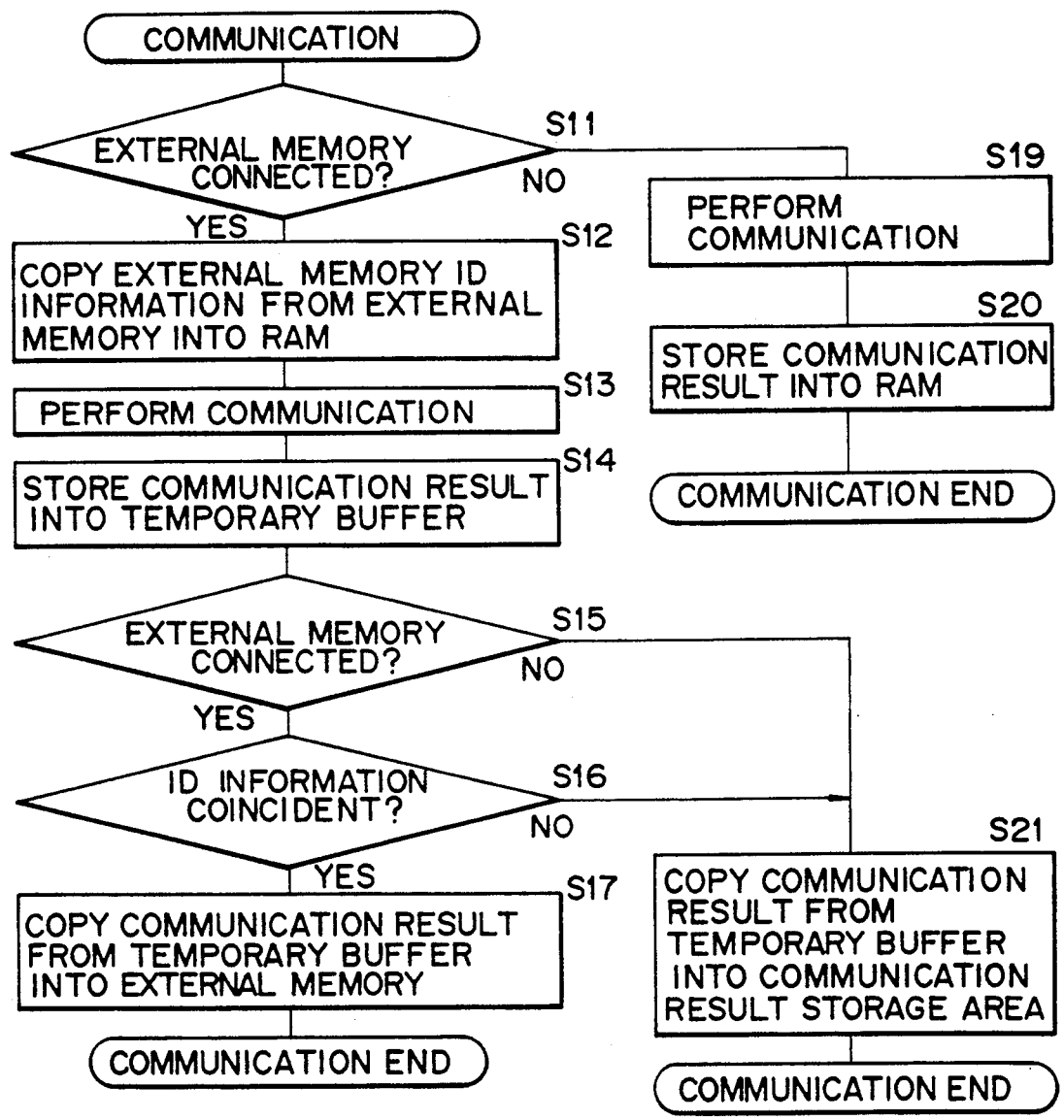
FIG. 3 is a flow chart showing a communication operation according to an embodiment of the present invention.
Figure 4:
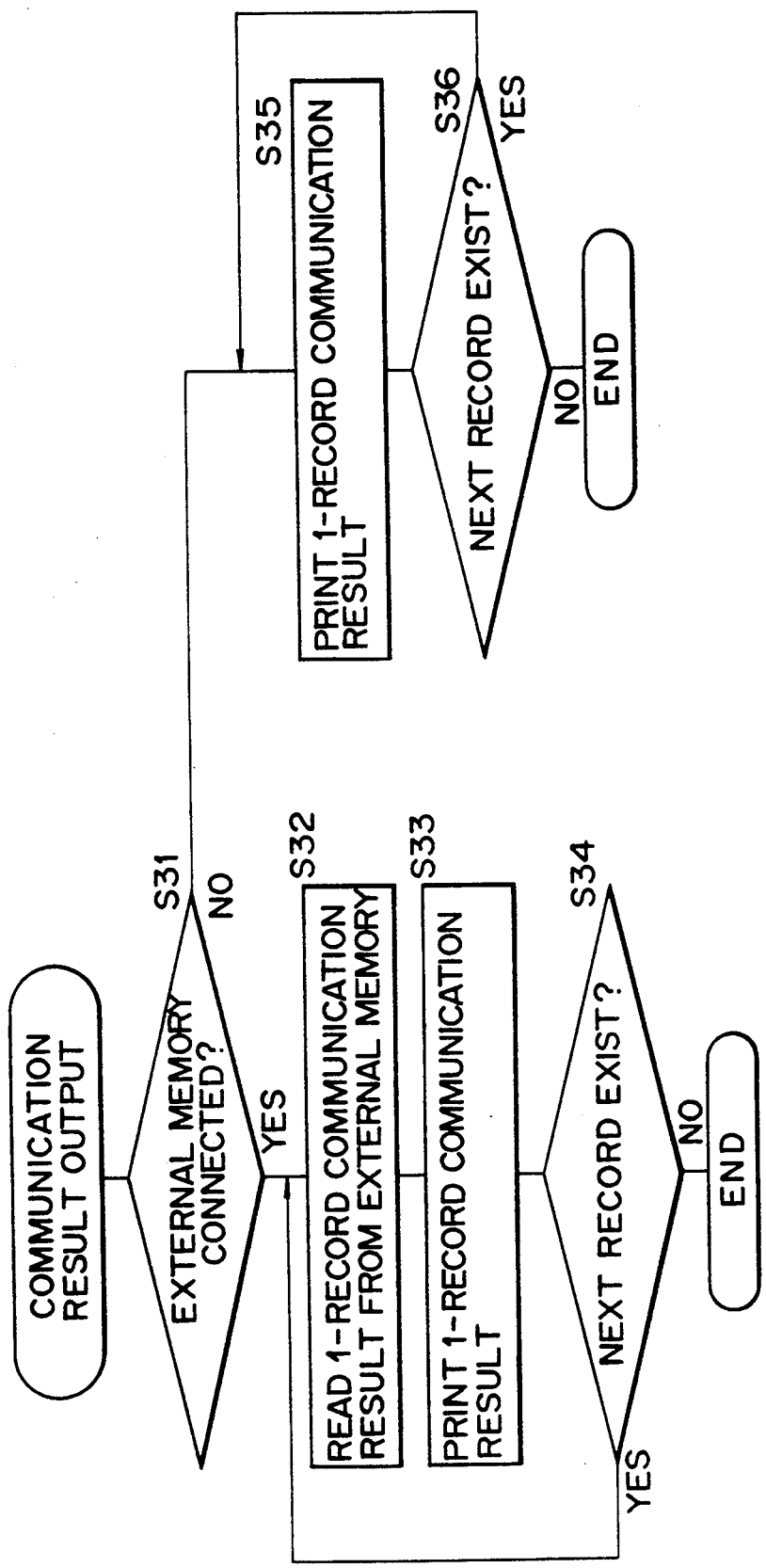
FIG. 4 is a flow chart showing the output operation for a communication result according to an embodiment of the present invention.

FIGS. 2 to 4 are flow charts showing the operation of the control unit 101.

In FIG. 2, the control unit 101 is in a stand-by state, and repeats a loop of S1→S2→S3→S4→S1 . . . .

When an instruction for sending or receiving from the operation unit 103 is given or a call signal comes from a telephone circuit N at this time (S1), a communication is performed (S5).

FIG. 3 shows this communication operation.

First, a sensor 119 detects whether or not a CPU 113 is loaded with the external memory 109 (S11), and if loaded, the ID information in the ROM 117 of the external memory 109 is read out.

Regarding the ID information, the name of the owner (department name) of the external memory 109 is used here, but data such as numerals or character strings, which can identify individual external memories 109 will also suffice. Although the ID information is stored in the ROM 117 in this example, it may be written in the RAM 116 from the control unit 101 to also be stored in the RAM 116.

The ID information, which has been read out, is copied into the RAM 115.

Figure 5:
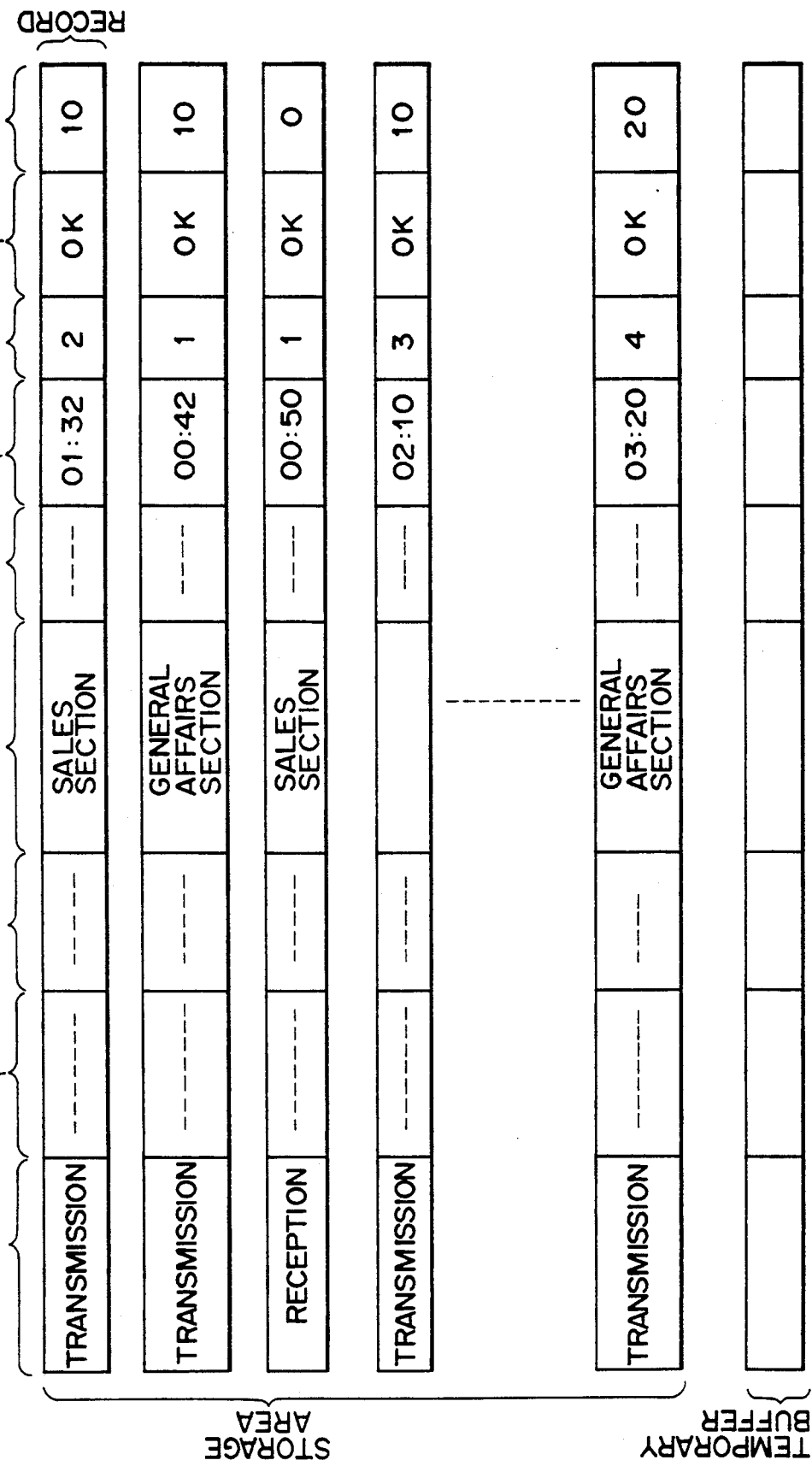
FIG. 5 is a typical diagram showing an area for storing a communication result of the main body RAM according to an embodiment of the present invention.

A communication (S13) is then performed, and the communication result is written into an temporary buffer of the RAM 115 (S14). In this RAM 115, as shown in FIG. 5, a communication result (hereinafter called "record") for one communication consists of each item of a communication mode, a communication partner Tel. number, a communication partner abbreviated name, ID information (user name of own apparatus), start time, communication time, number of sheets, a communication result, and charge. The RAM 115 provides an area for 41 records in total; 40 records for the retention and 1 record for temporary buffer.

The CPU 113 detects the presence of external memory S109 from the state of output of the sensor 119 (S15), and if it detects the external memory 109, it reads the ID information from the external memory 109 once again, to compare it with the ID information stored in the RAM 115 in S12 (S16). If the two coincide, the CPU 113 copies the communication result located in the temporary buffer of the RAM 115 into the external memory 109 (S17) to complete the communication. The communication result is stored in the external memory 109 in this way.

If the external memory 109 has not been loaded in S15 or if the ID information does not coincide in S16, the CPU 113 stores the communication result in the temporary buffer in an empty part of an area for communication results for 40 records in the RAM 115 to complete the communication. That is, when the external memory 109 is removed or replaced, the communication result is retained within the main body (control unit 101).

When the external memory 109 has not been loaded in S11, the communication result is written in the communication result storage area of the RAM 115 after communication (S19) to complete the communication (S20). In this case, the column of "ID information" (user name of own apparatus) will be left blank.

Return to FIG. 2 to resume the description.

After communicating in S5 as mentioned above, the control unit 101 returns to the stand-by loop again.

When the external memory 109, which has been removed at this time, is later loaded to the main body, the CPU 113 detects this through the sensor 119 (S2), reads out the ID information from the external memory 109 (S6), and compares it with the items of ID information of communication results in the RAM 115 (S7). If there is any item of coincidence, this communication result should be primarily stored in the external memory 109, but has remained in the RAM 115 because the external memory 109 had been removed at the time the communication was complete. Therefore the CPU 113 copies the communication result concerned into the external memory 109 (S8). The copied result is erased from the RAM 115 and is returned to the stand-by loop (S9).

In short, when the external memory 109 has been removed at the time of completion of transmission, the communication result is retained within the main body (control unit 101), and when the same external memory 109 is later loaded, the communication is transferred to the external memory 109.

Also, a communication result maybe output by the user during the stand-by loop in FIG. 2 (S3), at which time the communication result is output (S10).

FIG. 4 shows the communication result output operation.

First, the CPU 113 detects the presence of the external memory 109 through the sensor 119 (S31). If the external memory 109 is connected, one recorded communication result is read from the external memory 109 (S32), and one recorded communication is printed together with the ID information of the external memory 109 by the record unit 102 (S33). It is then determined whether or not a next record exists (S34), and if it exists, S32 is repeated. If not, the printing operation is complete.

Also, if the external memory 109 is not connected in S31, the communication result stored in the RAM 115 (S35, S36) is printed. That is, when the external memory 109 is loaded, print the communication result within the external memory 109, and if not, print the communication result within the main body.

According to an embodiment of the present invention as described above, even if users are increased, only the external memory 109 may be increased by storing communication result in the external memory 109, whereby an amount of communication for each user to be grasped will not be complicated.

Also, even if the external memory 109 has been removed when the communication is completed, the communication result is retained within the main body, and when the external memory 109 is later loaded, the communication result is transferred to the external memory 109 to prevent the communication result from being lost.

Further, the external memory 109 to has a peculiar ID information, which is read into and stored within the main body when communication starts. When the communication result is written in the external memory 109, the ID information is compared to assure that it coincides before writing. This has the advantage of securely writing the communication result in the external memory 109 of the user who has performed the communication.

When using a plurality of facsimile apparatuses, it is possible to control communication for a plurality of facsimile apparatuses using only one external memory 109. In this case, it is possible to know which facsimile apparatus has been used by each user of the external memory 109 if the CPU 113 writes, in the external memory 109, the ID information for facsimile apparatus together with the communication result.

The external memory 109 is also used to control local copying using the read unit 100 and the record unit 102.

Figure 6:
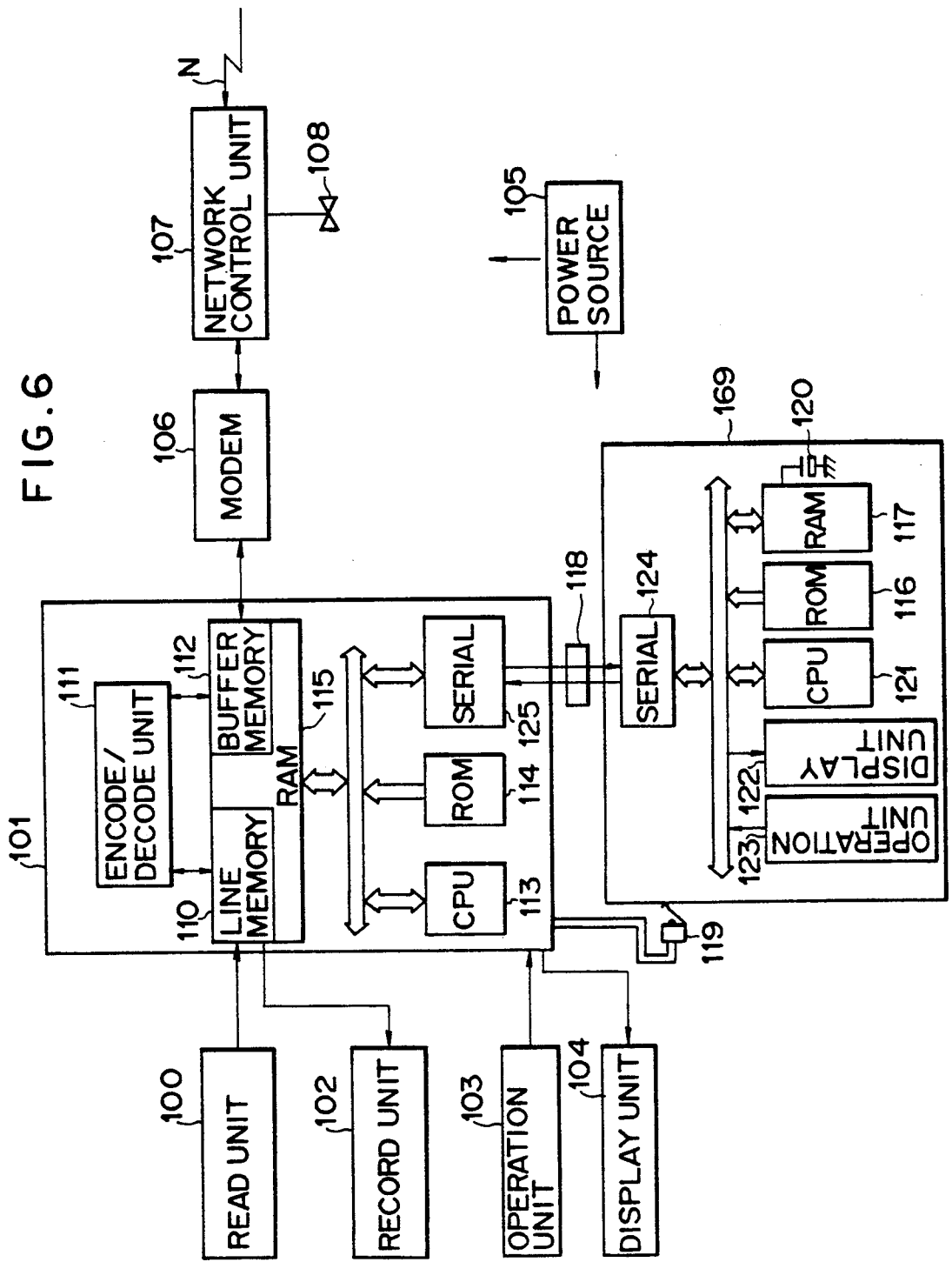
FIG. 6 is a block diagram showing another embodiment of the present invention.

FIG. 6 is a block diagram showing another embodiment according to the present invention.

In this second embodiment, an external memory 169 is a card electronic calculator type having a CPU 121 within, and equipped with a display unit 122 and an operation unit 123. The memory has functions of an electronic telephone directory, an electronic memo pad, etc. in addition to a calculating function, and then is equipped with an interface to communicate with the main body (control unit 101).

In FIG. 6, numerals 100 to 120 have the same configurations as in FIG. 1.

The CPU 121 controls the external memory 169, and serial interface circuits 124 and 125 perform serial communication for data between the main body (control unit 101) and the external memory 169. A display unit 122 displays a telephone number, a communication result, an external memory ID information, etc. within the external memory 169. An operation unit 123 has various input keys for the user to operate the external memory.

This embodiment is different from the above-mentioned embodiment in that the CPU 113 of the main body does not gain direct access to a RAM 116 and a RAM 117 within the external memory 169, but exchanges data through the control of the CPU 121 within the external memory 109.

In such an external memory 169, the communication result can be checked by the display unit 122 even if it has been removed from the main body, and the communication result can be further effectively controlled.

In the embodiment of the present invention, the external memory 169 has a function of an electronic telephone directory. Upon calling, the CPU 113 transmits a dial signal through a MODEM 106 on the basis of a telephone number which has been read out from the external memory 169.

The present invention has been described referring to preferred embodiments, and is not limited to these embodiment configurations, but, can be applied by modifying in various ways within the scope of the claims.

I claim:

1. A communication apparatus comprising:
   connecting means for connecting a memory card;
   communicating means for performing communication through a communication line;
   storing means for storing information relating to the communication by said communicating means corresponding to identification of the memory card which has been connected before the communication is performed by said comn.unicating means; and
   writing means for writing into the memory card the stored information relating to the communication, when an identification of the memory card which is connected after the communication is performed by said communicating means matches the identification of the memory card when the memory card was connected before the communication.

2. An apparatus according to claim 1, further comprising recording means for recording the information which has been written in the memory card.

3. An apparatus according to claim 2, wherein said recording means records the information which has been written in the memory card together with the identification of the memory card.

4. An apparatus according to claim 1, wherein said communicating means performs facsimile communication.

5. An apparatus according to claim 1, wherein said storing means stores the information indicating a communication partner.

6. An apparatus according to claim 1, wherein the first predetermined time is a communication start time by said communicating means.

7. An apparatus according to claim 1, wherein the second time is a time after completion of the communication by said communicating means.

8. An image receiving apparatus comprising:
   receiving means for receiving an image signal from a communication line;
   recording means for performing recording on the basis of the image signal which has been received by said receiving means;
   connecting means for connecting a memory card;
   storing means for storing information relating to the reception by said receiving means corresponding to identification of the memory card which has been connected before the image signal is received by said receiving means; and
   writing means for writing into the memory card the stored information relating to the reception when an identification of the memory card which is connected after the image signal is received by said receiving means matches the identification of the memory card when the memory card was connected before the image signal is received,
   wherein said recording means records the information read from the memory card.

9. An apparatus according to claim 8, wherein said recording means records the information which has been written in the memory card together with the identification of the memory card.

10. An apparatus according to claim 8, wherein said storing means stores information indicating a transmitting side of the received image signal.

11. An apparatus according to claim 8, wherein the first predetermined time is a reception start time by said receiving means.

12. An apparatus according to claim 8, wherein the second time is a time after completion of the communication by said receiving means.

13. A call apparatus comprising:
connecting means for connecting a memory card;
calling means for performing calling on the basis of calling information received from the memory card connected with said connecting means; and
writing means for writing a result of the calling by said calling means into the memory card,
wherein the memory card is capable of displaying the result of the calling written by said writing means.

14. An apparatus according to claim 13, further comprising recording means for recording the information read from the memory card.

15. An apparatus according to claim 13, wherein said writing means writes information indicating a called side.

16. An apparatus according to claim 13, wherein said calling means comprises receiving means for receiving the calling information from the memory card.

17. An image recording apparatus comprising:
recording means for recording an image;
connecting means for connecting a memory card;
storing means for storing information relating to the recording by said recording means corresponding to the identification of the memory card which has been connected before the image is recorded by said recording means; and
writing means for writing into the memory card the stored information relating to the recording when an identification of the memory card which is connected after the image is recorded matches the identification of the memory card when the memory card was connected before the image is recorded.

18. An apparatus according to claim 17, wherein said recording means comprises receiving means for receiving image data and records the image on the basis of the received image data.

19. An apparatus according to claim 17, wherein said storing means stores information indicating how many sheets have been recorded said recording means.

20. An apparatus according to claim 17, wherein the first predetermined time is a record start time by said recording means.

21. An apparatus according to claim 17, wherein the second time is a time after completion of the communication by said recording means.

22. An apparatus according to claim 17, wherein said recording means records the information read from the memory card.

23. A memory card which is connectable to a communication apparatus and which transmits to the communication apparatus calling information for generating a call and receives from the communication apparatus a result of a communication executed by the communication apparatus, said memory card comprising:
transmitting means for transmitting the calling information to the communication apparatus;
receiving means for receiving the result of the communication from the communication apparatus; and
displaying means for displaying the result of the communication received by said receiving means.

24. A card according to claim 23, further comprising storing means for storing the result received by said receiving means.

25. A card according to claim 23, further comprising storing means for storing a destination of the communication, for provision of the stored destination to the communication apparatus.

26. A card according to claim 23, wherein said receiving means comprises a serial interface circuit for serial communication with the communication apparatus.

27. An image transmitting apparatus comprising:
transmitting means for transmitting image data;
connecting means for connecting a memory card;
storing means for storing information relating to the transmission by said transmitting means corresponding to identification of the memory card which has been connected before the image data is transmitted; and
writing means for writing into the memory card the stored information relating to the transmission, when an identification of the memory card which is connected after the image is transmitted matches the identification of the memory card when the memory card was connected before the image data is transmitted.

28. An apparatus according to claim 27, wherein the stored information relating to the transmission includes information of how many sheets have been transmitted by said transmitting means.

29. An apparatus according to claim 27, wherein the stored information relating to the transmission includes time data.

30. An apparatus according to claim 27, wherein the stored information relating to the transmission includes information indicating a transmission destination of the image data.

31. An image transmitting apparatus comprising:
connecting means for connecting a memory card;
calling means for performing calling on the basis of calling information received from the memory card connected with said connecting means;
transmitting means for transmitting image data to a station called by said calling means; and
writing means for writing information relating to transmission by said transmitting means,
wherein the memory card is capable of displaying the information relating to the transmission written by said writing means.

32. An apparatus according to claim 31, wherein the stored information relating to the transmission includes information of how many sheets have been transmitted by said transmitting means.

33. An apparatus according to claim 31, wherein the stored information relating to the transmission includes time data.

34. An apparatus according the claim 31, wherein the stored information relating to the transmission includes information indicating a transmission destination of the image data.

* * * * *

UNITED STATES PATENT AND TRADEMARK OFFICE
CERTIFICATE OF CORRECTION

PATENT NO. : 5,309,251
DATED : May 3, 1994
INVENTOR(S) : HISAO TERAJIMA

It is certified that error appears in the above-identified patent and that said Letters Patent is hereby corrected as shown below:

COLUMN 3

Line 51, "an" should read --a--.

COLUMN 4

Line 44, "maybe" should read --may be--.

COLUMN 7

Line 48, "recorded said" should read --recorded by said--.

COLUMN 8

Line 62, "the" (first occurrence) should read --to--.

Signed and Sealed this

Fifteenth Day of November, 1994

Attest:

BRUCE LEHMAN

Attesting Officer    Commissioner of Patents and Trademarks